J. A. JOST.
BALANCING MACHINE.
APPLICATION FILED NOV. 22, 1909.

1,003,753.

Patented Sept. 19, 1911.

2 SHEETS—SHEET 1.

Witnesses
M. W. Darg.
L. A. Price.

Inventor
Jean A. Jost,
By Wm. E. Boulter,
attorney

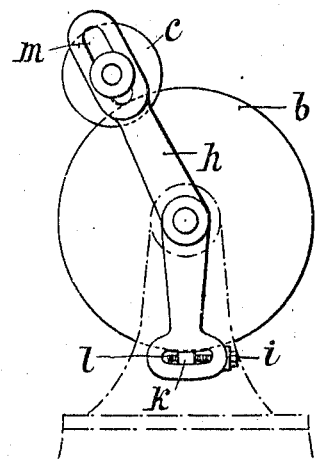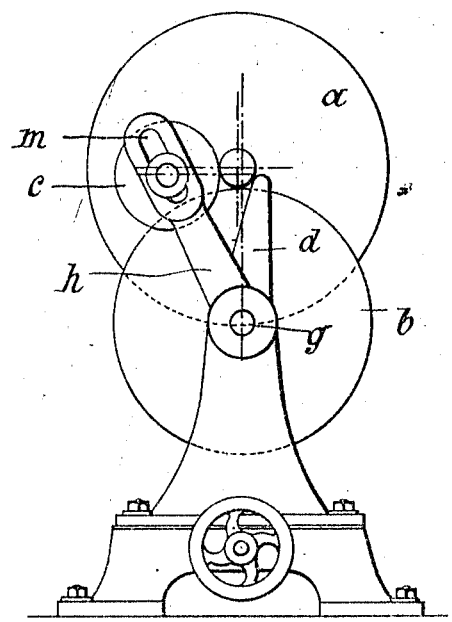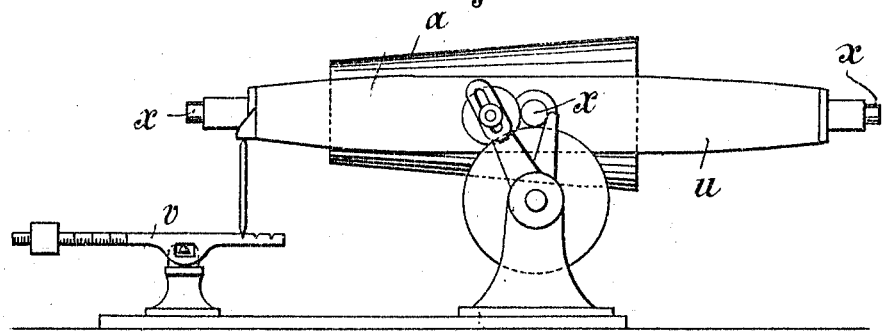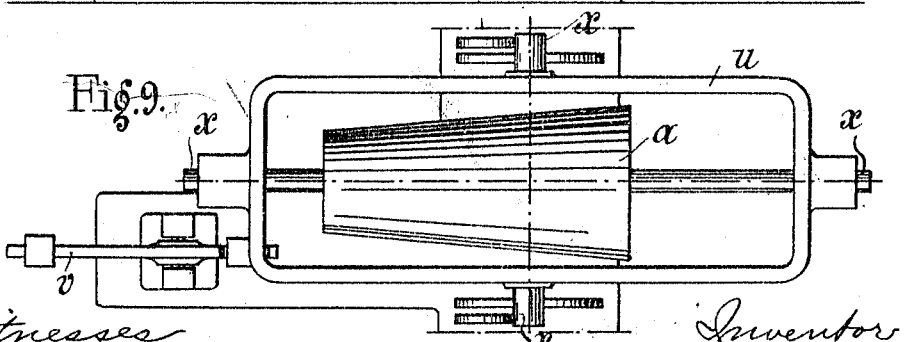

UNITED STATES PATENT OFFICE.

JEAN ANATOLE JOST, OF PARIS, FRANCE, ASSIGNOR TO SOCIETE JOST & CIE., OF PARIS, FRANCE.

BALANCING-MACHINE.

1,003,753.

Specification of Letters Patent. Patented Sept. 19, 1911.

Application filed November 22, 1909. Serial No. 529,400.

*To all whom it may concern:*

Be it known that I, JEAN ANATOLE JOST, a citizen of the French Republic, residing at Paris, in France, have invented certain new and useful Improvements in Balancing-Machines, of which the following is a specification.

This invention relates to a balancing machine with circular tracks, by means of which the faults in the equilibrium or balance of elements of any form provided with a materialized or non-materialized symmetrical axis, can be accurately indicated and ascertained, and in the majority of cases the exact place may be determined at which the mass intended to complete the equilibrium of the part should be added.

The principle of this machine consists in doing away with or reducing to a minimum all resistances to the oscillations of the elements to be balanced.

The machine comprises perfectly balanced disks or drums rotating with very slight friction on plain, ball or roller bearings.

The number, the relative position and the dimension of the circular tracks can vary according to the shape or the dimensions of the elements to be balanced, without departing from the spirit of this invention.

Figure 1:
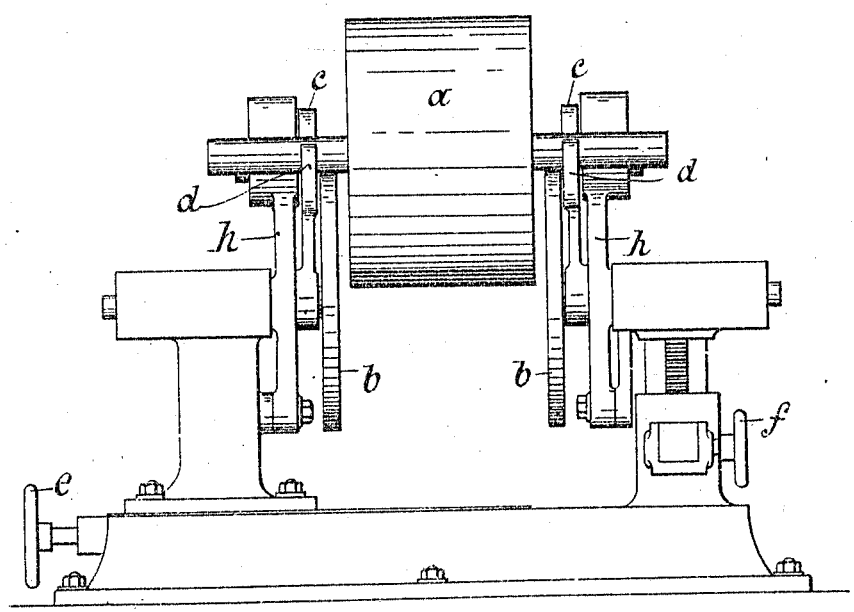

Figures 1-3 show a construction of this machine in which the elements to be balanced such as $a$ are placed on the machine, simply resting on two sets of bearing means each comprising a large disk $b$ on which the element is placed directly, a movable stop roller $c$ and a stop $d$, the working of which will be explained. The two sets of bearing means are sliding and adjustable as regards their distance apart, being operated by the hand wheel $e$. The element $a$ rests on two disks $b$, outside of and as close as possible to the vertical line passing through the center $g$ of the said disks, so that it always rests against the stop rollers $c$ which hold it. The latter being exposed thus to a pressure reduced to a minimum, the resistance to the oscillations of the part becomes as slight as possible. In order to obtain this result, the position of the said rollers is varied to suit the diameter of the element to be balanced. To that end, they are mounted respectively each on a support $h$ movable about a spindle which can be the same as, or different from, that of the disk $b$. The said supports can be moved as shown in the drawing, by means of a screw $i$ passing through the end of the support and a nut $k$ fixed to the frame and arranged to project into the slot $l$ of the said support-end. The said slot has divisions on the edge, so that the movement of each of them can be regulated to suit the diameter of the parts to be balanced. Moreover, to avoid any jamming, it is necessary that the points of contact of the spindle of the element $a$ with the stop rollers $c$ should be as near as possible to, and below, the horizontal line passing through the axis of the said part. At the upper portion of the supports $h$ therefore there is arranged a slide $m$ by means of which the position of the rollers can be regulated. The said slide may also be provided with divisions.

Figure 4:
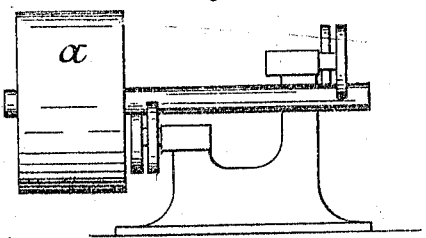

Fig. 4 shows an arrangement suitable for balancing those elements of which the principal portion overhangs the end of a spindle, which necessitate the relative movement of the two sets of disks which can always be vertically adjustable or not, and also adjustable or not as regards their distance apart.

Figure 5:
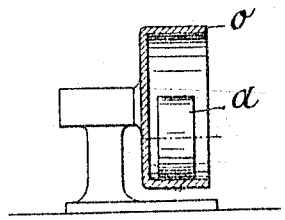

Fig. 5 shows a suitable device for balancing on an inner circular track and comprises a single drum $o$ adapted to rotate in a suitable frame, the element to be balanced being placed in the interior of said drum. It will be understood that the said element will act in the interior of the drum as it would have acted on the apparatus hereinbefore described. In case of elements of considerable length, the machine could be constituted by two apparatus with a drum identical to that hereinbefore described, facing each other, and adjustable vertically and also as regards their distance apart, or not adjustable.

Figure 6:
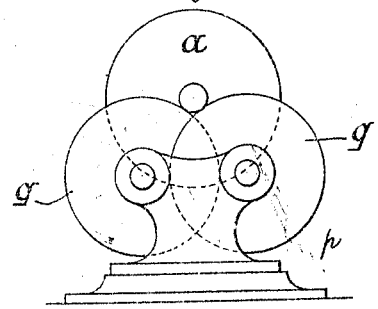

Fig. 6 shows a device in which the part rests on two bearings $p$ each constituted by two disks $q$ which are mounted so as to overlap. The position of the system is adjustable both as regards their distance apart and their vertical position as already stated, but the distance and the relative position of the disks of one and the same bearing are invariable. This arrangement which renders the machine more economical, has on the other hand the disadvantage of considerably reducing its sensitiveness owing to the jamming which takes place between the part $a$ and the disks $q$, which effects the accuracy and rapidity of balancing, but may be found sufficient in some cases.

Figure 7:
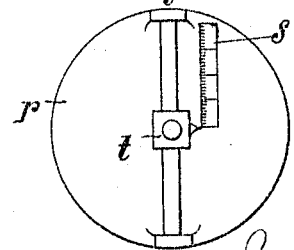

Fig. 7 shows an apparatus by means of which it is possible to calculate the defect in the balancing of the parts, as well as the weight required for reëstablishing their perfect balance, by taking into consideration the distance of the balancing weight from the symmetrical axis of the part. The apparatus in question is constituted by a disk $r$ or any perfectly balanced support, which is secured to the end of the spindle of the part to be balanced, and carries a rule or bar $s$ with divisions, in front of which can be moved with all desired accuracy a slide or suitable standard mass $t$. When a perfect balance is obtained, the standard weight $t$ is in the diametrical plane which must contain the balancing weight. The standard weight being known, its distance from the axis is read on the divided bar $s$, and the value of the balancing mass is calculated taking into account the position which it can occupy on the element. In the case of balancing elements of a certain length, the position of the weight on the circumference of which has been determined, it will be necessary to determine the zone in which the balance weight has to be placed. To that end is used a frame $u$ (Figs. 8 and 9) provided with four pivots $x$ on which it is balanced in every direction. The element to be balanced is placed in the said frame, so that its theoretical center of gravity should be exactly at the intersection of the axes of the pivots $x$. The latter are hollow in order to afford passage to the spindles of the elements when they are provided with spindles, or in order to receive the fixing means suitable to the form of the elements. The weighted part of the circumference being at the bottom, the position which the element will assume, will indicate the desired position relatively to the diametrical plane of the said circumference. The frame in question can also be used for balancing elements in any direction.

When it is desired to determine more exactly the place which is to be occupied by the balance weight, the means shown in Fig. 7, or that shown in Figs. 8 and 9, is used, constituted by a beam $v$ with variable points of engagements on which is shifted a movable weight for bringing the frame $u$ into equilibrium horizontally.

What I claim as my invention and desire to secure by Letters Patent is:—

A balancing machine having two systems of sliding tracks comprising respectively, a circular plate freely rotating around its axis, an arm adjustable around the axis of said plate and having a slot in the extremity thereof, a roller rotating freely around its axis and mounted in said slot and a lateral stop carried by the axis of said plate, the roller and the stop combining for supporting the element to be balanced on the periphery of the plates of the two systems which are adjustable as to relative height and distance apart.

In testimony whereof I have signed my name to this specification in the presence of two subscribing witnesses.

JEAN ANATOLE JOST.

Witnesses:
H. C. COXE,
GEORGES BONNEUIL.